(12) United States Patent
Offutt

(10) Patent No.: US 10,074,288 B2
(45) Date of Patent: Sep. 11, 2018

(54) METHOD OF DISPLAYING CONTENT FOR READING TRAINING USING COMPREHENSION MONITORING

(71) Applicant: Jane Offutt, Pittsburgh, PA (US)

(72) Inventor: Jane Offutt, Pittsburgh, PA (US)

( * ) Notice: Subject to any disclaimer, the term of this patent is extended or adjusted under 35 U.S.C. 154(b) by 199 days.

(21) Appl. No.: 15/061,657

(22) Filed: Mar. 4, 2016

(65) Prior Publication Data

US 2017/0256176 A1 Sep. 7, 2017

(51) Int. Cl.
*A63F 9/24* (2006.01)
*G09B 7/08* (2006.01)
*G09B 5/02* (2006.01)

(52) U.S. Cl.
CPC .................. *G09B 7/08* (2013.01); *G09B 5/02* (2013.01)

(58) Field of Classification Search
CPC .................. G09B 7/02; G09B 7/08
See application file for complete search history.

(56) References Cited

U.S. PATENT DOCUMENTS

| 5,256,067 | A  | * | 10/1993 | Gildea  | G09B 7/02 434/167 |
| 2002/0076675 | A1 | * | 6/2002 | Budra | G09B 5/00 434/167 |
| 2005/0196732 | A1 | * | 9/2005 | Budra | G09B 7/00 434/169 |
| 2009/0142737 | A1 | * | 6/2009 | Breig | G09B 21/008 434/178 |
| 2010/0133750 | A1 | * | 6/2010 | Carlson | A63F 1/06 273/272 |
| 2013/0084976 | A1 | * | 4/2013 | Kumaran | G06F 17/2845 463/30 |

\* cited by examiner

*Primary Examiner* — Steve Rowland
(74) *Attorney, Agent, or Firm* — Michael G. Monyok

(57) ABSTRACT

The discloser describes a method of displaying text as a reading training aid to activate a reader's comprehension monitoring. In embodiment, a user is presented with a title on a display, which disappears when text related to the title is shown to the user. After reading the text, the user must decide whether the title, which is no longer visible on the display, matched the content of the text. If a user answers incorrectly, they are presented with a waiting period before continuing. In other embodiments, the text of the paragraph is removed from the display before the user is asked to evaluate a summarization of the text.

15 Claims, 15 Drawing Sheets

FIG. 2     103

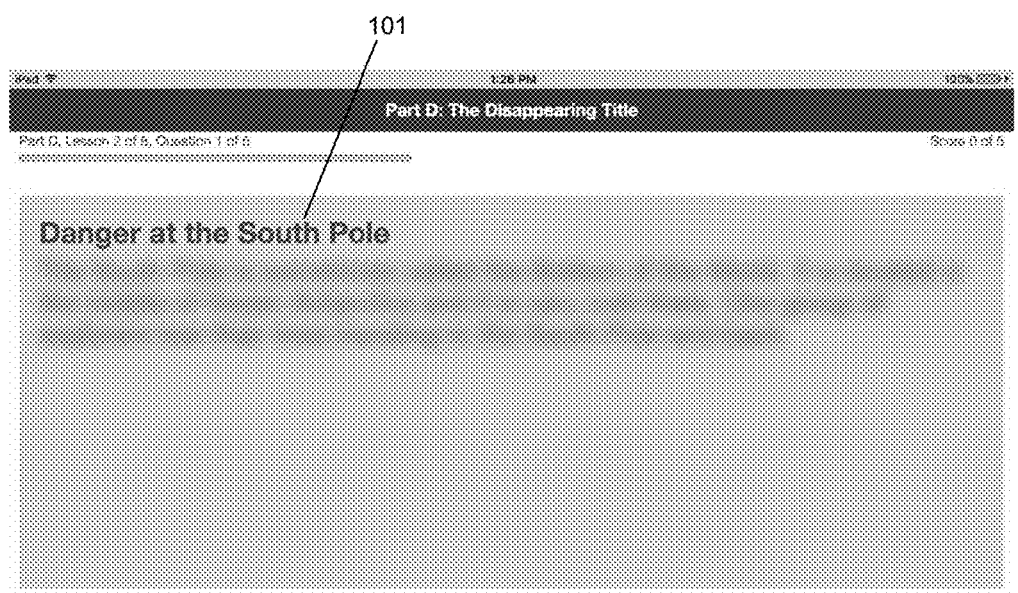
FIG. 4

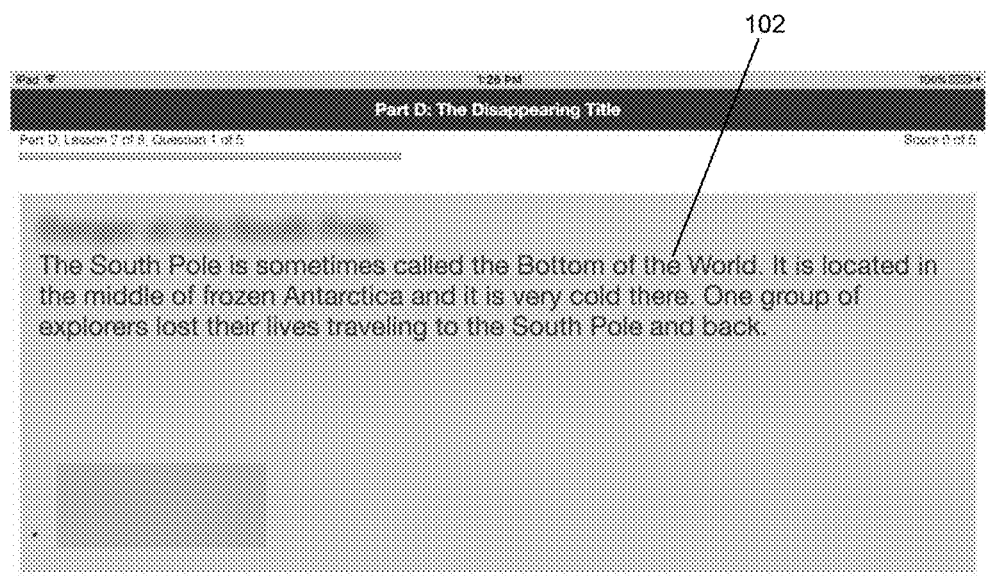
FIG. 5

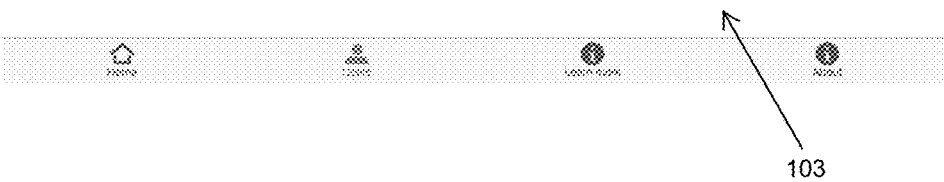
FIG. 7

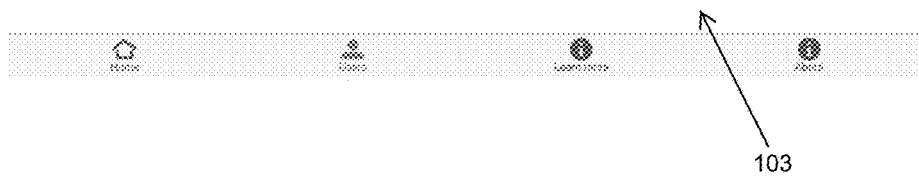
FIG. 8

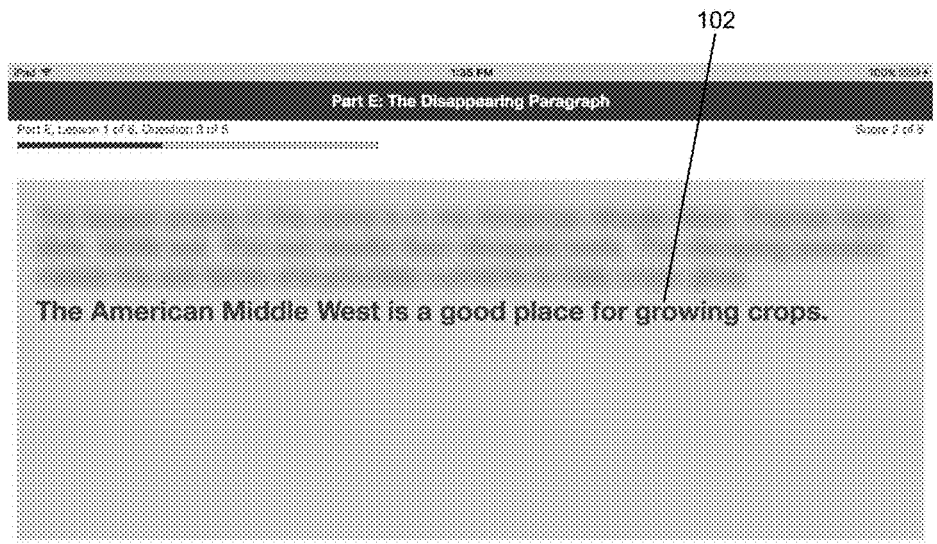
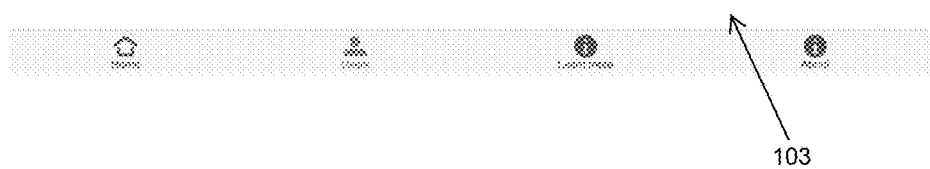
FIG. 10

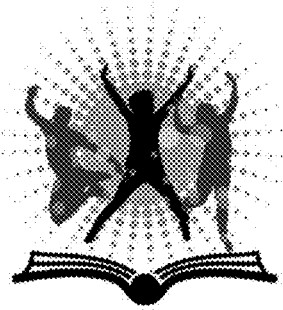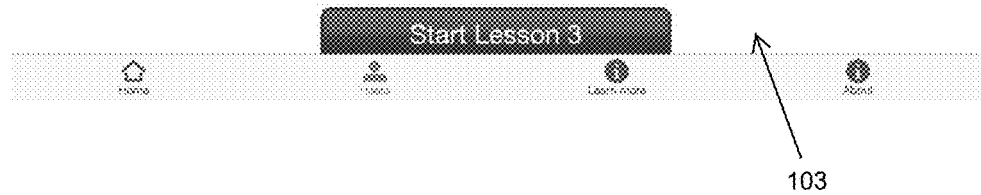
FIG. 12

FIG. 13

METHOD OF DISPLAYING CONTENT FOR READING TRAINING USING COMPREHENSION MONITORING

CROSS-REFERENCE TO RELATED APPLICATIONS

Not applicable.

STATEMENT REGARDING FEDERALLY SPONSORED RESEARCH

Not applicable.

BACKGROUND OF THE INVENTION

The invention relates to a method of displaying content to a reader as a training device. More specifically, the invention relates to a systematic method of displaying content that activates a reader's comprehension monitoring, a metacognitive skill, to improve the reader's understanding of written text.

Comprehension monitoring is critical to the active processing of information, which is necessary for the reader to construct meaning while reading fiction and non-fiction information. On various occasions, all readers have had the experience of not fully understanding what they read. However, good readers are mindful of when they do not fully understand and are able to employ strategies to fix the breakdown in their comprehension processes. Less able readers are not mindful of when they do not understand; therefore, they are not able to remedy their poor comprehension of written text.

Good readers intentionally or unintentionally generate the mindfulness (or awareness) necessary for good comprehension. They tend to process information more actively and they realize when their understanding (comprehension) has broken down. They tend to employ strategies to fix their lack of understanding. Two of these strategies include re-reading previous text and looking ahead to subsequent text. Looking back confirms whether they have understood the ideas correctly. Looking ahead confirms whether the information is consistent with what they think the information is about and whether it continues to make sense. Looking back and looking ahead reassures the reader that they are not only correctly understanding, but also that the information they are reading is consistent with previously acquired information. By reading previous and subsequent text and by checking incoming information against common sense criteria, the reader is actively constructing meaning in order to optimize their understanding of written text.

Good readers also actively integrate information, i.e., they engage in a process of combining isolated ideas so that they gain meaning from text which is qualitatively different from the isolated ideas that make up the text. In other words, the essential meaning of a sentence encompasses more than the meaning of the individual words in a sentence. Likewise, the essential meaning of a paragraph encompasses more than the meaning of individual sentences in a paragraph.

Good readers also check incoming information against previously acquired knowledge to verify that ideas make sense. This process is known as hypothesis testing. If the incoming information is consistent with what they already know, their hypothesis about the incoming information is maintained (assimilation). However, if the incoming information is not consistent with what they already know, they eliminate the current hypothesis and formulate a new hypothesis, more consistent with the incoming information (accommodation). Hypothesis testing is an important process in comprehension monitoring and in constructing meaning.

Good readers are also able to construct inferences from text. Similar to hypothesis testing, constructing inferences requires readers to summon prior knowledge (what they know about the world). This is important because it's impossible to write out (describe) everything that is necessary to understand (comprehend) written text. For instance, if a reader reads a paragraph which mentions playground swings, they must summon their prior knowledge of playground swings in order to create an image (definition), critical in the construction of meaning.

Good readers can be compared somewhat to skilled card players who seem mindful of when to hold on to cards and when to throw away cards. Skilled card players possess "meta-skills" which go beyond just knowing the rules and knowing how to play a particular game of cards. Novice card players may eventually acquire these "meta skills" after playing many games or with the guided help of an expert player. Similarly, readers can acquire the "meta-skills" of reading, i.e. monitoring ongoing comprehension of incoming information. This comprehension monitoring is necessary for optimally understanding the meaning of written text.

Reading is a complicated skill. Good comprehension involves decoding words both effortlessly and automatically in order for the mind to focus on constructing meaning. Beginning reading instruction focuses on the basic skills of decoding words and understanding the meaning of words. Improving these basic skills positively impacts reading comprehension at lower levels.

Instruction in the teaching of advanced reading skills, however, focuses on teaching readers strategies that help them develop the "meta-skills" of reading: monitoring incoming information and testing it against previously acquired knowledge. Advanced "meta-skills" also require readers to develop an awareness of when they are not understanding the meaning and to engage in remedies to fix this lack of comprehension in order to optimize their comprehension written text.

Two of the current methods for fostering comprehension monitoring are direct classroom instruction by a teacher and traditional workbook exercises. A classroom teacher can assist the process of comprehension monitoring by asking pre-reading questions: "What do you think the story or article will be about?" (predicting); and "What do we already know about this subject?" (prior knowledge). After reading, the teacher can informally assess whether students have understood the story or article by asking post-reading questions "Who and what was this story or article about?"; "Summarize the action of the story."; and "Summarize the important information." The problem with this method is that it is haphazard in fostering comprehension monitoring. Some students may adopt the strategies of predicting, hypothesizing, and summarizing to enhance comprehension monitoring. Other students may rely on listening to classroom discussion without adopting strategies that enhance their ability to understand written text. More importantly, a teacher cannot monitor all of the students in the class simultaneously to determine if the student is comprehending the text as they are reading it.

A second method for fostering comprehension monitoring involves traditional reading comprehension workbook exercises. These exercises ask a student to read a story or article and to answer multiple choice questions. While these exercises isolate the learning to individuals, these exercises may or may not foster comprehension monitoring for particular students. Reader A may decide not to read the story or article and to randomly choose (guess) A, B, C, D, or E. This method does not foster comprehension monitoring because the reader has not even tried to understand the text. Reader B may read the story or article and comprehend well enough that he or she can take an "educated guess." This method does not foster comprehension monitoring because the reader has not achieved the goal of knowing for sure he or she has fully understood the written text.

If the traditional workbook exercises are computer generated, Reader A and Reader B may see the CORRECT answer briefly (such as A, B, C, D, or E), but showing the correct answer does not afford them an opportunity to reflect on why they did not understand a paragraph correctly. If a good reader, Reader C, answers a question correctly, the next question appears. With traditional reading comprehension exercises, Reader C, the good reader is reinforced for his or her reading skill, but no explicit or implicit training has occurred to help average or less abled readers become better readers.

In traditional reading comprehension exercises, readers are not provided the necessary guided practice needed to learn or improve comprehension monitoring, a reading "meta-skills." The traditional reading exercises do not necessarily command a reader to summon prior knowledge, neither to hypothesize about the text nor to summarize the text. Also, readers are not provided necessary guided practice to improve deliberate and purposeful reading. They are not given time after each question to reflect on why their answer was incorrect. Reflection is important to the development of the reading "meta-skills" necessary for improving reading comprehension. Therefore, it would be advantageous to develop a reading training method to help readers develop these "meta-skills."

BRIEF SUMMARY OF THE INVENTION

According to embodiments of the present invention is a method of displaying text in order to train readers in advanced reading comprehension skills, specifically comprehension monitoring. The method induces readers to summon prior knowledge, to hypothesize about the text, and to summarize the text. The method, which is implemented via an electronic tablet executing computer readable instructions in one embodiment, also prevents readers from answering haphazardly because it pauses briefly so that readers who get a wrong answer are presented with the text again and can re-read the question to answer it correctly before subsequent text is displayed.

More specifically, the method comprises a series of instructions and accompanying text presented to the user on the display of an electronic device. In one embodiment, readers are presented with two types of decision-making tasks. The first decision making task asks readers to decide "Does everything make sense?" This task prompts readers to activate information that they already know (prior knowledge). The 2$^{nd}$ decision making task asks readers to decide whether two sentences have the same meaning or whether a sentence and a paragraph have the same meaning. This task requires readers to summarize information and to hypothesize its meaning. Additionally, this decision making task becomes more challenging in subsequent lessons, which include a disappearing title and a disappearing paragraph in the text presented to the user. The reader must be sure that he or she understands information before that information disappears and new information appears.

BRIEF DESCRIPTION OF THE SEVERAL VIEWS OF THE DRAWINGS

FIG. 4 is a screenshot whereby the user sees the title on the screen, which disappears when the user decides that she can remember the title and taps the Continue button.

FIG. 5 is a screenshot whereby the title has disappeared and only a paragraph appears on the display; the user reads the paragraph and decides whether the meaning of the paragraph matches the title previously displayed.

FIG. 7 is a screenshot of the display which provides the user with information explaining the importance of summarizing information.

FIG. 8 is a screenshot which provides the user information on how to carry out the reading task in one embodiment involving a disappearing paragraph.

FIG. 10 is a screenshot whereby the paragraph has disappeared and only a summary sentence appears on the screen.

FIG. 12 is a screenshot indicated that the user has obtained a passing score for the lesson.

FIG. 13 is a screenshot displayed to a user who has not passed a lesson.

DETAILED DESCRIPTION OF THE INVENTION

Figure 1:
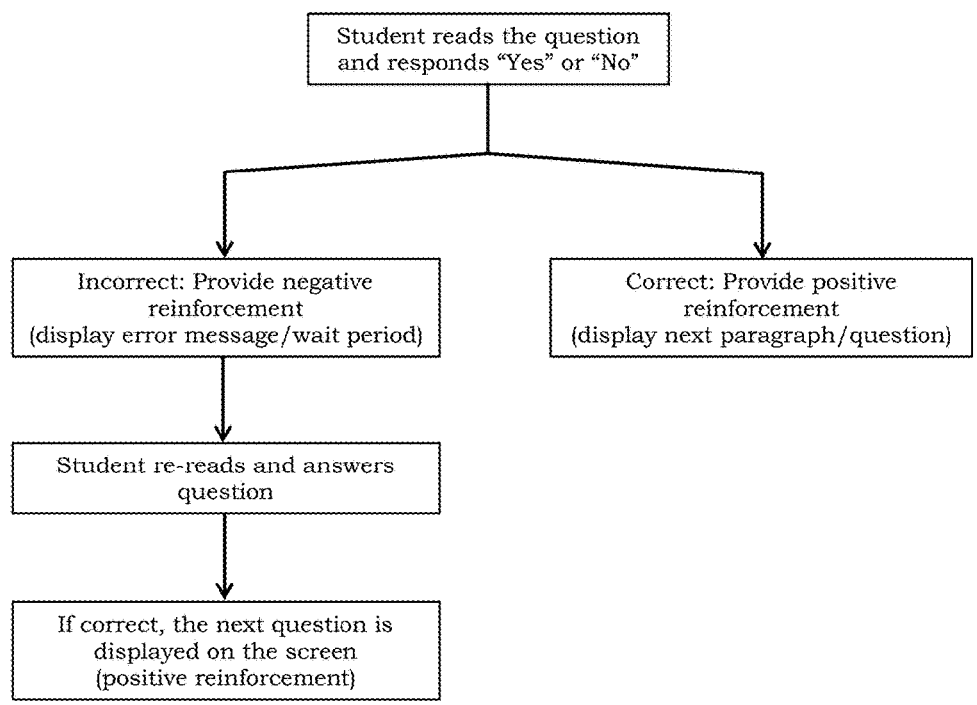
FIG. 1 is a flowchart depicting a decision making process presented to the reader according to one embodiment of the present invention.

In accordance with one embodiment, FIG. 1 shows a flowchart depicting a decision making task presented to a user. The task is presented to the user on the display 103 of the electronic device, such as a computer, laptop, or tablet. In this configuration, the student is asked to read a portion of text. Next, on the display 103 the user is presented with a "Yes" or "No" question related to the text just read by the user. If the user answers correctly, the next question is presented. Advancing to the next question serves as positive reinforcement for the student. If the student answers the question incorrectly, an error message is displayed and the student is asked to re-read the text. The error message serves as negative reinforcement. The content and questions presented to the user and responses received from the user is accomplished through the use of computer readable instructions executed by the electronic device (or an 'App', for example).

For example, after reading a title or paragraph, a user is prompted to push the "Continue" button whenever, they are able to remember the information. The title or paragraph disappears, and new information appears on the screen 103. After reading the new information, the user responds "Yes" or "No" to the question "Does the title match the meaning of the paragraph?" or "Is this a good summary statement for the paragraph?" This task not only fosters comprehension monitoring, but it also fosters deliberate remembering. The user must hold information in working memory while she reads and evaluates additional information. To be successful, the user must "parse" the information (understand the "gist," the gestalt, or inherent meaning) because working memory has limited capacity. While holding this information in working memory, she must process new information. More specifically, she must draw connections between the information in working memory and the new information in order to decide whether the two pieces of information have the same meaning.

Specifically, in one training prompt, only a title for a paragraph (or first part 101 of a text) appears on the screen. When a user decides that he can remember the title, he pushes the "Continue" button on the screen 103, which causes the title to disappear. After the title is removed, the main text of the paragraph (or second part 102 of the text) is displayed to the user. He reads the paragraph and decides whether the meaning of the paragraph matches the title. If he answer correctly, the next title appears on the screen 103. That is, the user is reinforced for the correct answer. While the title is referred to as the first part 101 of the text and the paragraph is the second part 102 of the text in this embodiment, other portions of the text will be presented first in alternative embodiments.

If the user answers incorrectly, the title and paragraph appear on the screen 103 along with the following prompt: "Re-read the text and try again in 20 seconds." After 20 seconds, the title appears again, and the user must answer the question correctly before the next question appears. The "wait time" forces the user to reflect so that when he reads the next question, he will engage in deliberate and purposeful reading, monitoring his comprehension so that he draws the correct connection between the meaning in the title and the meaning in the paragraph.

Figure 2:
FIG. 2 is a screenshot of a display illustrating the information presented to a user which explains the importance of titles in understanding the meaning of paragraphs.
Figure 3:
FIG. 3 is a screenshot which provides the user information on how to carry out the task in one embodiment with a disappearing title.

FIG. 2 shows a screenshot of the instructions presented to a user, or reader, for the disappearing title lesson. As shown in FIG. 2, the reader is instructed to think about what ideas might be in a paragraph based on the title. As shown in FIG. 3, the reader is provided with additional detail about the disappearing title lesson. Specifically, the reader is instructed to press "Enter/Continue" when she has memorized the title, at which point the title will disappear and the paragraph will be displayed. FIG. 4 shows the display 103 at the beginning of a lesson. On this screen, only the title is initially presented to the reader, with a "Continue" button presented at the bottom of the display. Once the reader has read the title and pushed the "Continue" button, the title disappears and the text of the paragraph is presented on the display, as shown in FIG. 5. At this stage, the reader is asked whether the title matches the meaning of the paragraph.

Figure 6:
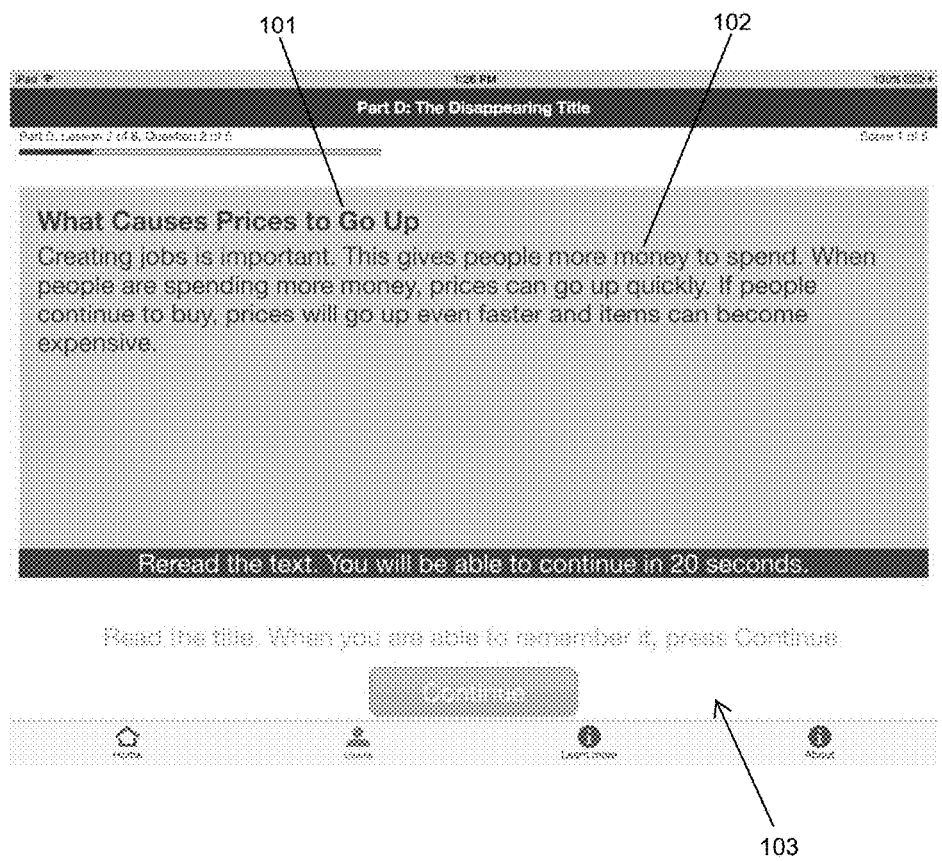
FIG. 6 is a screenshot which shows an error message that is displayed if the user answers incorrectly.

In the example presented in FIGS. 4-5, the title does not match the text. If the reader indicates that the text does match, the reader is presented with the error display shown in FIG. 6. On this screen, the reader is prompted to re-read the text. In one configuration of the present invention, a 20 second delay is implemented before the reader is able to view the next lesson. The delay serves as a negative reinforcement for a reader who does not give the correct answer. Unlike other instruction methods, this prevents readers from racing through a lesson (simply to be finished) without truly understanding the content, a problem with many multiple choice and self-guided lessons.

Moreover, the error message on this screen encourages the user to figure out why she made a mistake. This type of feedback also provides "aversive" control. Users will try to avoid this error message and the "wait time" when they answer upcoming questions. This type of feedback encourages users to monitor their comprehension and to think carefully (reflect) before pushing a response key.

Figure 9:
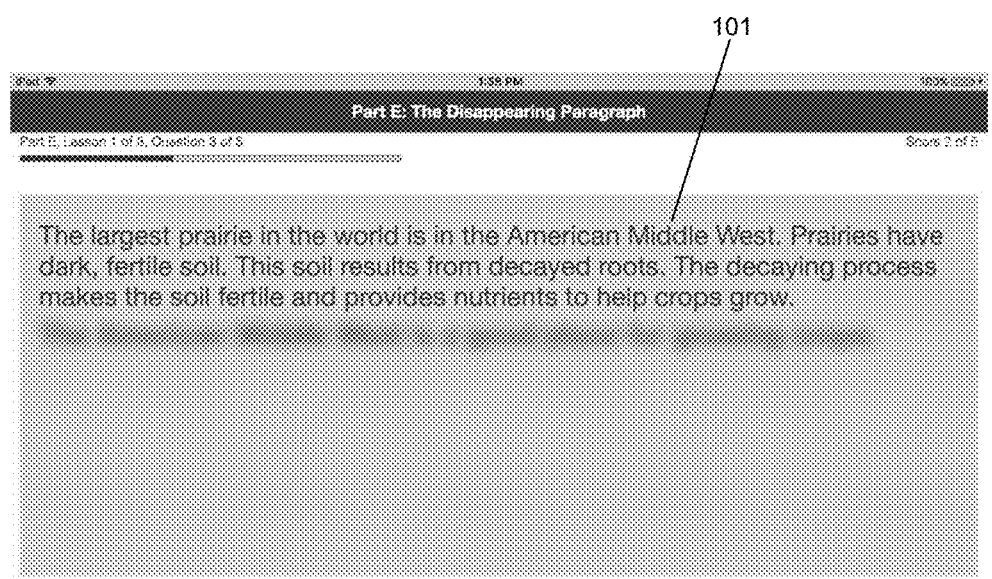
FIG. 9 is a screenshot illustrating how the user sees a paragraph on the screen before tapping the Continue button.

In an alternative lesson, the reader is presented with the text of the paragraph, which will disappear when the reader is prompted to answer a question about the content of the paragraph. An example of the instructions presented to a user for this lesson is shown in FIG. 8. When readers decide they can remember the meaning of the paragraph, they are prompted to push the "Continue" button on the screen 103, as shown in FIG. 9. The paragraph disappears and a summary statement appears. They read the summary statement and decide whether the meaning in the summary statement matches the meaning of the paragraph. As shown in FIG. 10, they are prompted to press "Yes" or "No" on the display 103. If they answer correctly, the next paragraph appears on the screen 103, meaning they are positively reinforced for a correct answer. The feedback for a correct response is immediate and non-disruptive. Successful performance is an important positive reinforcement. It does not distract the user's attention away from information important for them to learn.

Figure 11:
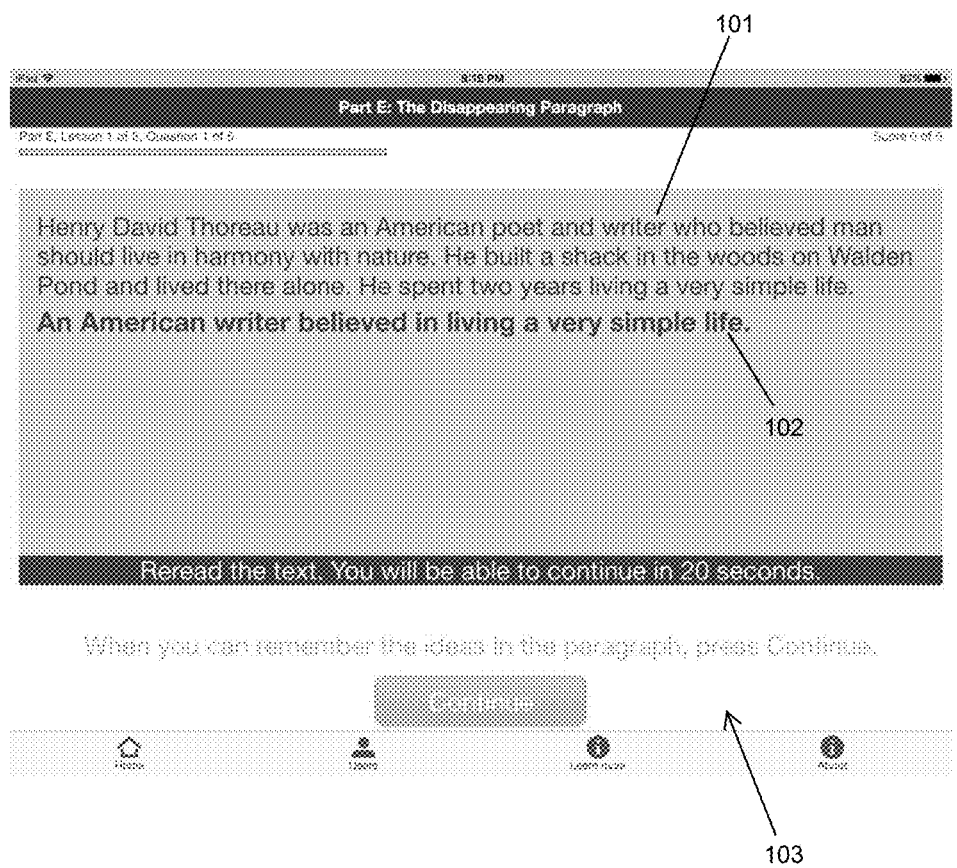
FIG. 11 is a screenshot which shows the error message displayed to a user when he answers incorrectly; after a short "wait time," the YES and NO buttons appear and the user attempts to answer the same question correctly.

If they answer incorrectly, the paragraph and summary statement appear on the display along with the following prompt: "Re-read the text. You will be able to continue in 20 seconds." FIG. 11 shows a screenshot of the error message presented to the user on the display 103. Similar to the previous lesson example, the computer software engages in "wait time" (a 20 second pause, for example). After 20 seconds, the paragraph appears again, and the reader must answer the question correctly before the next question appears. The "wait time" forces the reader to reflect so that when they read the next question, they will engage in deliberate and purposeful reading, monitoring their thinking so that they draw the correct connection between the ideas in the paragraph and the idea of the summary statement. In alternative embodiments, the wait time is varied from 20 seconds.

By executing the method on an electronic device and enforcing the waiting period, the method is particularly suited to readers who are learning how to monitor their comprehension because it forces reflection. Practice in these two decision making tasks "Does it make sense?" and "Do They Have the Same Meaning?" encourages readers to utilize comprehension monitoring skills and to develop the "meta" reading skills that are necessary for optimal understanding of written text.

The method of the present invention improves comprehension monitoring using behavior modification techniques. In addition to increasing a child's understanding of written text, the lessons and messages presented to the reader, when presented in a manner discussed in the example embodiments, modify cognitive behaviors of the user. As those having skill in the art understand, behavior can be modified by rewarding desirable behavior and by punishing undesirable behavior. By rewarding favorable behaviors and punishing unfavorable behaviors, an individual's behavior can be "conditioned." Operant conditioning is a powerful technique. In the field of education, this technique is known as behavior modification. By implementing the method on an electronic device, the reader is provided immediate feedback. As such, the method is uniquely suited to help individuals modify how carefully they read (comprehension monitoring). Comprehension monitoring is a metacognitive reading skill whereby students become aware of how well they are understanding information.

As discussed above, the method of the present invention does this by rewarding careful reading and "punishing" haphazard reading. If a student reads carefully and gets the correct answer, the program immediately presents the student with the next question. Getting a correct answer is powerful reinforcement. If a student reads haphazardly and gets the wrong answer, the program presents the student with an error message, "Reread the text and try again in 20 seconds." Getting a wrong answer creates powerful aversion. In order to avoid wrong answers, students learn to read each paragraph carefully before tapping the "YES" or the "NO" on the display.

Good comprehension monitoring is shaped through the desire to be rewarded positively with the immediate appearance of the next question. It is also shaped through the desire to avoid error messages and the wait period. The student can positively modify his or her cognitive behaviors by a strong desire for immediate positive reinforcement and by a strong desire to avoid negative reinforcement.

The efficacy of students performing the lessons on an electronic device, according to the method of the present invention, is superior to students' interacting with a teacher when it comes to improving reading comprehension behaviors. The electronic device provides immediate feedback tailored to the individual whereas a teacher's reinforcement is mostly delayed, intermittent, and, many times, directed toward a group of students.

In education, it is common practice to use criterion referenced scoring to determine whether a student has mastered (acquired) a specific skill set. Referring again to the figures, FIG. 12 shows the completion screen displayed to a reader when they finish a lesson. In one embodiment, the reader must obtain at least an 80% score to begin the next lesson, as 80% is often set as the established expectations to deem a student proficient in the mastery (acquisition) of specific knowledge skills. However, the passing rates can be set differently for individual readers. Alternatively, the passing rate can vary as the reader becomes more proficient in their reading skills. For example, the passing rate could be 80% for the first two lessons, 85% for the next two lessons, and 90% for the final set of lessons. In one configuration, there are eight vanishing title lessons and eight vanishing paragraph lessons, where each lesson presents the reader with five paragraphs. If the reader does not receive a criterion score of 80% for the lessons, the programming has them repeat the lesson. As shown in FIG. 13, the reader is presented with "Start Lesson Again" button to retry the lesson.

Figure 14:
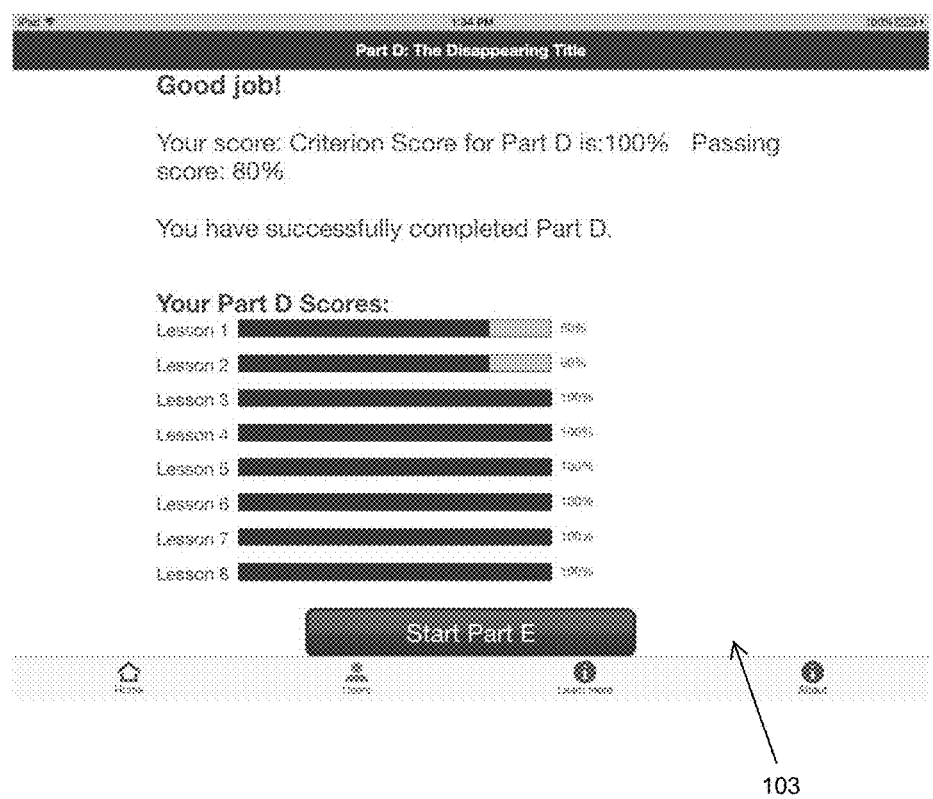
FIG. 14 is a chart displayed to a user summarizing the scores for a series of lessons.
Figure 15:
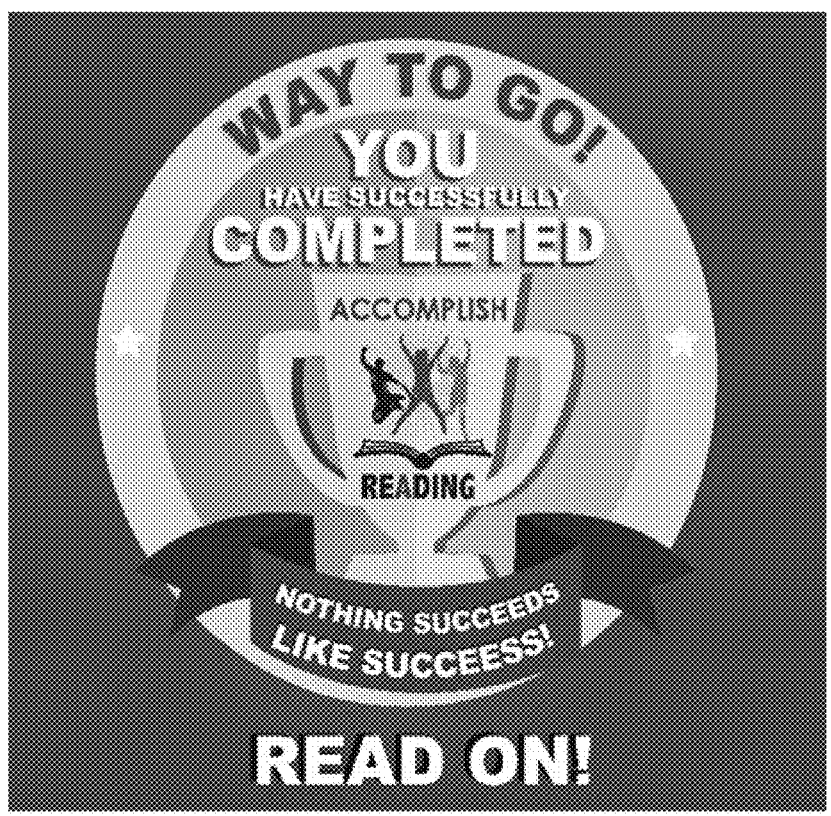
FIG. 15 is a screenshot notifying a user that she has completed the program.

Students are not able to proceed to the next lesson until they have mastered the current lesson. Mastery is important to successful reading. When students complete a set of lessons, they are shown a graph (as shown in FIG. 14) which shows a successful score on each lesson and a criterion score of 100% for that section because they have had to achieve at least 80% on all 8 lessons. The graph can be used by a teacher to determine areas that require further attention when the method is used to supplement tradition classroom instruction. When students successfully complete all sections of the training program, they are congratulated on successfully completing the program, as shown in FIG. 15. Simple graphics provide positive rewards as students complete each group of lessons. The positive rewards reinforce careful reading or comprehension monitoring, an important metacognitive reading skill.

The method of the present invention provides necessary guided practice for the acquisition of comprehension monitoring skills. This method is superior to the direct classroom instruction. It is true that a classroom teacher could prompt comprehension monitoring by asking students to conjure prior knowledge, to hypothesize about upcoming ideas, and to summarize information. However, teachers cannot supervise every student simultaneously. As such, the student may begin reading the next paragraph before fully understanding the previous paragraph. In addition, the teacher cannot implement the time delay to reinforce the negative feedback.

It is thought that modeling this approach to written text will result in readers adopting the strategy of comprehension monitoring; however, the results can be hit or miss. Also, classroom modeling may help readers better understand a particular text, but may not transfer to better comprehension of written texts that readers encounter outside of the classroom.

In addition, the method of the present invention provides an improved method for the acquisition of comprehension monitoring skills compared to traditional workbook exercises or workbook exercises adapted to the computer. Traditional workbook exercises ask readers to read a paragraph and to choose the correct answer among multiple choice answers, usually A, B, C, D, E. If the reader chooses the correct answer the next question appears. If the reader chooses an incorrect answer, the statement, "No, the correct answer is "C" (for example). Then, the next question will appear. Traditional exercises do not provide feedback that allows the reader to reflect, to develop reading "meta-skills," or to answer questions deliberately rather than impulsively.

On the other hand, the method of the present invention utilizes the unique capacity of an electronic device to provide innovative decision making tasks as well as immediate, instructive feedback. The feedback for a correct answer is immediate and non-disruptive. It provides positive reinforcement and it does not distract the readers' attention away from the text; readers are able to concentrate on the reading task so that they learn that reading requires concentration.

Feedback for incorrect responses is instructive. An error message appears as well as the same decision-making task. The error message informs the reader that the lesson has paused and that they can try again in 20 seconds. An implicit idea in the error message is communicated: to encourage readers to read carefully and to deliberate an answer before pushing "Yes" or "No." It is thought that readers will be more motivated to monitor their comprehension in order to achieve better success in answering questions.

While the example lessons described so far are relevant to beginning readers, the method of the present invention can be expanded to more accomplished readers as well. For example, in one alternative embodiment, the method is adapted to electronic textbooks to improve older students' ability to read high school level text, such as Social Studies, with good comprehension. In this configuration, the written text is segmented so that students become aware of whether they understood difficult ideas adequately before reading additional information. The text might be structured as shown below.

In one example, a student is presented the following text on a display 103:

"The constitutional position of the colonies In the British colonies of North America, the acquisition of subjecthood by naturalization or denization would be bound up with both ideals of citizenship and economic perspectives. The colonies were, in their constitutional origins, very heterogeneous: a first legal distinction that could be made among them, at least initially, was between the charter colonies (Rhode Island, Connecticut and Plymouth Colon), and the proprietary colonies (Maine, New York, New Jersey, Pennsylvania, Maryland, Virginia, Carolina, and Georgia). But the colonies all emerged in one way or another by royal prerogative, since the English territories in American were the domain of the crown. As such, the English Parliament exercised almost no control over them."

Unlike other embodiments of the present invention for younger readers, understanding complex ideas would not necessarily require the paragraph to disappear because an important skill for students reading more complicated text is to go back into the text to find specific information. As such, the following question is displayed below the paragraph:

"Initially, the British Parliament showed little interest in the North American colonies. Is this statement a good summary of the paragraph?" The reader would then be prompted to press "Yes" or "No" on the display 103.

Once answering correctly, the reader is then presented with the next paragraph, such as:

"However, during the Commonwealth and after the Restoration, the English Parliament had begun to take more of an interest in the colonies, primarily out of economic and military interest. Parliament passed navigation acts in 1651, 1660, and 1663 which provided that all trade with the colonies was to be carried out by English ships with English seamen, and that all products being shipped to Europe first had to go through England. It was in the interest of enforcing this legislation that imperial officers, supervised by the Privy Council with its Committee of Trade and Plantations, were stationed in all of the colonies, regardless of their divergent constitutional structure."

To assess whether the reader correctly understands this paragraph, they would be presented with the following statement and asked whether it is a good summary of the text: "British Parliament began to supervise colonial trade because they required additional funds. Is this statement a good summary of the paragraph?"

In some embodiments, the questions require the student to recall information from all previous paragraphs. This would be particularly applicable to more advanced readers or more complex topics.

In yet another alternative embodiment, the method of the present invention incorporates audio add-ons for adult non-readers. With the addition of an audio component, the method of the present invention could be helpful to adults who lack literacy skills. Poor literacy skills directly impact quality of for these adults as well as their family. A lack of literacy affects opportunity for good jobs.

Reading acquisition for adults is challenging because they do not want to begin with books aimed at children. This can be degrading and discouraging. In one embodiment, the method of the present invention includes audio, so adults would be able to listen to factual information and follow the text carefully. If they didn't understand, they would be able to listen to the information again before tapping "Yes" or "No" on the screen. It would be important for adult non-readers to listen and follow the text in order to understand how sound and text correspond to each other.

This immediate and non-disruptive feedback makes the method an improved method for improving reading comprehension when compared to workbook exercises because students cannot "get away with" randomly guessing at answers. For example, random incorrect answers result in computer "wait times." The "wait time" ideally encourages students to re-read (important to comprehension monitoring) or it encourages careful reading (another comprehension monitoring skill). "Wait time" also encourages readers to respond carefully and deliberately.

While the disclosure has been described in detail and with reference to specific embodiments thereof, it will be apparent to one skilled in the art that various changes and modification can be made therein without departing from the spirit and scope of the embodiments. Thus, it is intended that the present disclosure cover the modifications and variations of this disclosure provided they come within the scope of the appended claims and their equivalents.

What is claimed is:

1. A method of displaying content to a reader on a display of an electronic device comprising:
  presenting a first part of a text on the display;
  removing the first part of the text from the display in response to an input from a reader,
    wherein the input indicates that the reader is able to remember the first part of the text;
  presenting a second part of the text on the display;
  presenting a question to the reader,
    wherein the question assesses the reader's comprehension of whether the first part of the text coordinates with the second part of the text, and
    wherein the question assesses whether the reader can process and evaluate the second part of the text while retaining the first part of text in working memory;
  receiving an answer to the question from the reader,
    wherein the answer to the question is 'yes' or 'no';
  providing positive reinforcement to the reader if the answer is correct,
    wherein the positive feedback is provided immediately on the display; and
  providing negative reinforcement to the reader if the answer is incorrect,
    wherein the negative reinforcement comprises a wait period, and
    wherein the first part of the text is presented on the display after the wait period.

2. The method of claim 1:
  wherein the first part of the text comprises a title; and
  wherein the second part of the text comprises a paragraph.

3. The method of claim 1:
  wherein the first part of the text comprises a paragraph; and
  wherein the second part of the text comprises a summary.

4. The method of claim 1, wherein the question requires the reader to summon prior knowledge related to at least one of the first part of the text and the second part of the text.

5. The method of claim 1, wherein the question requires the reader to hypothesize about the first part of the text.

6. The method of claim 1, wherein the question requires the reader to summarize the first part of the text.

7. The method of claim 1, wherein providing positive reinforcement comprises:
  presenting a subsequent first part of a text;
  removing the subsequent first part of the text from the display in response to a subsequent input from the reader;

presenting a subsequent second part of the text on the display;

presenting a subsequent question to the reader,
wherein the subsequent question assesses the reader's comprehension of whether the subsequent first part of the text coordinates with the subsequent second part of the text.

8. The method of claim 7, wherein the reader is required to answer correctly a plurality of additional questions to successfully complete a lesson.

9. The method of claim 1, wherein providing negative reinforcement further comprises:
redisplaying the first part of the text on the display after the wait period; and
presenting the question to the reader again.

10. The method of claim 1, further comprising:
displaying instructions to the reader prior to presenting the question.

11. The method of claim 1, wherein providing negative reinforcement further comprises:
displaying an error message instructing the reader to re-read the first part of the text.

12. The method of claim 2, further comprising:
displaying instructions to the reader,
wherein the instructions direct the reader to understand the title before providing the input.

13. The method of claim 3, further comprising:
displaying instructions to the reader,
wherein the instructions direct the reader to understand the paragraph before providing the input.

14. The method of claim 1, wherein the wait is about 20 seconds.

15. The method of claim 8, further comprising:
displaying a report summarizing a score for each question upon completion of a lesson.

* * * * *